United States Patent Office 3,663,726
Patented May 16, 1972

3,663,726
LUBRICATING GREASE
Roy L. Waring, Moore, Okla., assignor to Cities Service Oil Company, Tulsa, Okla.
No Drawing. Filed Nov. 28, 1969, Ser. No. 880,948
Int. Cl. C10m 5/14, 5/08
U.S. Cl. 252—28                                    10 Claims

ABSTRACT OF THE DISCLOSURE

A lubricating grease having a consistency of about 220 to about 430 penetration number when measured by the method of ASTM D-217 and a density of substantially less than water. The lubricating grease comprises at least one grease thickener and a lubricating fraction including at least one lubricating fluid and at least one linear polymer which is soluble in the lubricating fluid. A method is provided for controlling the consistency of the lubricating grease and the viscosity of the lubricating fraction independent of density, by controlling the amount of the polymer in the grease composition.

BACKGROUND OF INVENTION

(1) Field of invention

This invention relates to a lubricating grease having a high dropping point, said grease including a lubricating fraction of high viscosity and adhesiveness. The invention further relates to a method of controlling lubricant viscosity independent of density.

(2) Description of prior art

"Black lithium" lubricating grease is commonly used in steel mills for general purpose lubrication of heavy steel processing equipment. Such "Black lithium" grease contains a substantial amount of asphalt as part of the lubricating fluid to impart the high viscosity and adhesiveness needed to keep the grease from running out of the bearings at the high temperatures encountered. However, the use of asphalt as a constituent of the grease gives the grease a relatively high density. When, in service, the grease picks up mill scale, which is iron oxide, and becomes heavier than water, it then will not float on water and is not removed by the gravity skimming-type oil removal systems generally used in such plants. This gives rise to a serious water pollution problem.

SUMMARY OF INVENTION

The present invention provides a lubricating grease which has a consistency of about 220 to about 430 penetration number when measured by the method of ASTM D-217 and a lubricating fraction with a high viscosity, of at least about 12.92 to about 58.9 centistokes at 210° F. when measured by ASTM D-445. The finished grease therefore has a high degree of adhesiveness and a density substantially less than water. As a result, the lubricating grease of this invention is particularly well suited for those applications in which "Black lithium" grease is presently used and overcomes the problems inherent in the use of such "Black lithium" grease, as discussed hereinabove.

The lubricating grease of this invention comprises at least one grease thickener and a lubricating fraction including at least one lubricating fluid and at least one linear polymer of a molecular weight such that it is soluble in the lubricating fluid. The inclusion of the linear polymer in the grease composition serves to increase the viscosity of the lubricating fluids. However, since the linear polymers used in the grease composition of this invention are of approximately the same specific gravity as conventional lubricating oils, the grease composition has a density substantially less than water thereby enabling contaminated grease to be removed in conventional oil removal systems.

The lubricating fractions described above can be used in conjunction with any grease thickener whereby to form a lubricating grease of desirable properties. However, in the particular service for which it is developed, the use of the material near red hot steel makes it desirable for the lubricating grease to have a high dropping point. Therefore, the exemplary greases described hereinafter utilize lithium soap, aluminum complex soap, and silica gel as the grease thickeners, although any other high melting point grease thickener or mixtures thereof could equally well be used.

DESCRIPTION OF PREFERRED EMBODIMENTS

The grease composition of this invention comprises about 3% to 20%, preferably between 6% and 8%, by weight of at least one grease thickener, about 70% to 96%, preferably between 87% and 91%, by weight, of at least one lubricating fluid having a viscosity of between about 40 to 165 SUS at 210° F., and about 1% to 25%, preferably between 2% and 5%, by weight, of at least one linear polymer having an average molecular weight of at least about 1000 and higher up to the limit of its solubility in the lubricating fluid component of the composition. Chemical additives may, if desired, be added to the grease composition to improve oxidation resistance, rust protection and extreme pressure properties of the grease.

When the grease thickener is a lithium soap, it preferably comprises a mixture of a major amount of lithium hydroxystearate and a minor amount of lithium stearate and lithium naphthenate soaps. In this mixture the lithium hydroxystearate, which constitutes up to about 75% to 80% or more of the lithium soap component of the grease, provides the grease with a high dropping point and mechanical stability. The lithium stearate and lithium naphthenate soaps which comprise about 15–20% and 5–10%, respectively, of the soap component of the grease help control oil bleeding and improve performance of the additives, if used. It will be understood that other lithium soaps, in varying amounts, may also be used in the present invention. Thus, lithium soaps which may be used in the grease composition of this invention include those in which the acid portion of the soap consists of naturally occurring long chain monocarboxylic saturated and unsaturated fatty acids having from 7 to 22 carbon atoms, such as stearic, lauric, oleic and palmetic acids as well as other carboxylic acids derived from tallow, hydrogenated fish oil, castor oil and the like.

The method by which such lithium soaps may be formed is well known and generally involves heating the carboxylic acid with an hydrated, reactive lithium compound, such as for example, lithium hydroxide monohydrate. The amount of lithium compound which is used in forming the lithium soap constituent should be approximately the stoichiometric amount required to react with substantially all of the carboxylic acids present. Satisfactory results have been obtained by heating to about 400° F. a reaction mixture containing 10% to 15% by weight of lithium hydroxide and 85% to 90% by weight of a mixture of naphthenic acid, hydrogenated tallow acid and hydrogenated castor glycerides.

The lithium soap constituent of the grease is dispersed in a suitable lubricating fluid or mixture of fluids. Generally, the lubricating fluid constituent comprises between about 70% to 96% by weight and preferably between 87% and 91% by weight of the grease composition. It will be apparent to those skilled in the art that the amounts and properties of the lubricating fluids used may be varied somewhat to obtain the proper fluid viscosity, which should be between about 5.75 and 31.8 centistokes at 210° F. when measured by ASTM D-445. The final viscosity of the grease composition of this invention is, of course, controlled by the addition of the linear polymer.

Satisfactory results have been obtained by using as the lubricating fluid constituent a mixture of about 20%–30% of naphthenic neutral oil having a viscosity of about 650 SUS at 100° F. (60 SUS at 210° F.); about 30%–45% of a mid-continent solvent-extracted paraffinic neutral oil having a viscosity of about 200 SUS at 100° F. (45 SUS at 210° F.) and a viscosity index of about 95; and about 35–45% of a solvent-extracted brite stock having a viscosity of about 150 SUS at 210° F. and a viscosity index of about 95. It is generally preferred that at least a portion of the lubricating oil comprise naphthenic oil which is used during the formation of the lithium soap. This naphthenic oil is desired for saponification to minimize soap content by making soap of the optimum structure. Naphthenic oils having a viscosity other than that disclosed hereinabove may also be used in the preparation of the soap. Almost any good lubricating oil of suitable viscosity to obtain the proper base oil viscosity may be used, in addition to the naphthenic oil, in the lubricating fluid constituent of the grease composition.

A grease composition in accordance with this invention is provided by dissolving a controlled amount of a linear polymer in the lubricating fluid. The use of a linear polymer in the grease composition provides a high viscosity in the lubricating fraction and gives the grease adhesive properties. Since the linear polymers used in this invention have about the same specific gravity as conventional lubricating oil, the grease composition has a density substantially less than water. Thus, the use of a long chain linear polymer in solution in a lubricating fluid, which is thickened with a lithium soap, provides a method of controlling the viscosity of the grease independent of its density.

Polymers, to be suitable for use in the present invention, must be soluble in all proportions with hydrocarbons of lubricating oil viscosity. The polymer therefore must be substantially linear with a minimum of cross-linking and not be of excessive molecular weight. Polymers which may be used in this invention generally have an average molecular weight of at least about 1000 and higher up to the limit of their solubility in the lubricating fluid. In addition, the polymers must have a specific gravity approximately equivalent to that of conventional lubricating oils. At least one linear polymer may be used including, for example, polyisobutylenes, polyacrylates including polymethacrylates, polyethacrylates and copolymers thereof, polyalkylstyrenes, low molecular weight polyethylene, polypropylene polymers and the like. Particularly satisfactory results are obtained using polyisobutylene polymers having a molecular weight of between 5,000 and 20,000 (Staudinger method).

The amount of polymer added to the lubricating fluids is, of course, dependent on the consistency of the lubricating fluid used in preparing the grease and the desired consistency of the grease composition. The amount of polymer added must be sufficient to provide a lubricating grease having a consistency of about 220 to 430 penetration number when measured by method ASTM D-217 and a density of substantially less than water. Generally, the grease contains between about 1% and 25% by weight of the polymer with amounts of between 3% and 5% by weight being preferred. In order to incorporate the polymer in the grease composition, the polymer is dissolved in the lubricating fluid at grease manufacturing temperatures. The polymer may be added either in the form of a solid or as an oil solution of the polymer, such as for example an 18% to 20% solution of the polymer in a solvent extracted neutral oil having a viscosity of about 200 SUS at 100° F.

Conventional chemical additives may, if desired, be incorporated in the grease composition to improve oxidation resistance, rust protection, extreme pressure properties and the like. Thus, oxidation inhibitors of the amine, phenolic, phosphite and sulfur types may be added at about 0.1 to 0.5% concentration. Additives such as amine salts, metal sulfonates and naphthenates, esters and nonionic surfactants may be used as anti-rust additives. Lead soaps, sulfurized animal oils and variou antimony, sulfur, halide and phosphorous-containing additives may be included as extreme pressure additives. Generally additives may be used in amounts of from about 0.5% to 8% and preferably about 3% to 6% by weight of the grease composition.

The improved lubricating grease of this invention can be manufactured according to conventional techniques. As discussed hereinabove, the consistency of the grease may be controlled independent of grease density by utilizing a linear oil soluble polymer in the composition to provide the grease with a lubricant fraction having high viscosity.

The following examples are set forth to illustrate, not to limit, the invention whereby those skilled in the art may understand more fully the nature in which the present invention can be carried into effect. In the instant specification and appended claims all parts and percentages are by weight unless otherwise indicated.

EXAMPLE I

The following is a description of the method of preparing a lubricating grease in accordance with a preferred embodiment of this invention. In Table 1 below is listed the components of this particular composition, and the process of preparing the lubricating grease is then described.

Table 1

| Component: | Amount, percent by wt. |
|---|---|
| Lithium hydroxide | 0.86 |
| Refined naphthenic acids | 0.33 |
| Hydrogenated tallow fatty acid | 1.20 |
| Hydrogenated castor glycerides | 5.11 |
| Naphthenic neutral oil 650 SUS at 100° F. | 20.35 |
| Solvent extracted neutral oil 200 SUS at 100° F. 95VI | 23.12 |
| Solvent extracted brite stock 150 SUS at 210° F. 95VI | 32.38 |
| 18% solution of polyisobutylene in 200 SUS at 100° F. solvent extracted neutral oil | 16.65 |
| | 100.00 |

In open kettle preparation of the grease in accordance with this preferred embodiment, an aqueous solution of the lithium hydroxide is formed by dissolving the lithium hydroxide in about 4.75 times its weight in water. About one-half of the naphthenic neutral oil used in the composition is mixed with the aqueous lithium hydroxide solution and stirred until a uniform mixture is obtained. The naphthenic acid, hydrogenated tallow acid and hydrogenated castor glycerides are then blended into the mixture and the resulting mixture heated to about 210° F. for about 15 minutes, at which time the mixture is heated to about 400° F. and held at this temperature for about 20 minutes. The remainder of the naphthenic oil is then added to the heated mixture to cool it. The 200 SUS at 100° F. neutral oil is then added with stirring to the mixture after crystallization of soap has occurred in the mixture (at about 360° F.). The 150 SUS at 210° F. brite stock is added to the mixture when the temperature of the mixture is below about 340° F. After the mixture has cooled to below about 300° F., the solution of polyisobutylene in 200 SUS at 100° F. neutral oil is added and stirred into the batch. The batch is blended until it has cooled to below 200° F. at which time additives may be introduced. The resulting grease is milled and de-aerated, if necessary. The grease may then be packaged for use. The grease composition of this example has a consistency of about 300 penetration number when measured by ASTM D-217 and a density of about 7.5 lbs./gal. Thus, the grease compositon has a high viscosity and a density substantially less than water.

EXAMPLE II

As indicated hereinabove, satisfactory lubricating greases within this invention are obtained utilizing any high temperature lubricant thickener. One such thickener is aluminum complex soap. An exemplary composition of such a lubricating grease is given in Table 2.

Table 2

| | Wt. percent |
|---|---|
| Kolate 7013 [1] | 3.28 |
| Benzoic acid | 1.87 |
| Hydrogenated tallow fatty acids | 4.35 |
| Naphthenic neutral oil, 650 SUS at 100° F. | 18.77 |
| Paraffinic neutral oil, 200 SUS at 100° F. | 21.34 |
| Brite stock, 150 SUS at 210° F. | 29.87 |
| 18% solution of polyisobutylene in 200 SUS neutral oil at 100° F. | 15.36 |
| Lead naphthenate, 30% lead | 1.66 |
| Sulfurized sperm oil, 12% sulfur | 3.00 |
| Vanlube 601 [2] | 0.50 |

[1] Trademark of Agrashell, Inc., for a reactive aluminum organic hydroxide containing 13.5% reactive aluminum, 50% 80 SUS at 100° F. naphthenic oil, and 36.5% volatile matter.
[2] Trademark of R. T. Vanderbilt Co., Inc., for a metal deactivator.

In preparing the grease in accordance with this embodiment, the Kolate, benzoic acid, tallow fatty acids and all oils are mixed, and heated for a period of time and at a temperature sufficient for the reactive aluminum to commence a chemical reaction with the organic acids (about 210° F.). As the aluminum reacts, the volatile fraction of the material is released. After about 2 hours, more heat is added and the material is raised to a temperature of about 400° F. after which, with continued stirring, the grease mass cools to a temperature at which the polyisobutylene solution may be conveniently added. Alternatively, pure polyisobutylene may be added (in lesser amounts, of course, than would be required if added as a solution) while adding the required amount of 200 neutral to the oil blend. After addition of the polyisobutylene, the various EP and rust inhibitor additives are added at temperatures below those at which the additives become reactive, e.g., about 170-190° F. The resulting mixture is then passed through a colloid mill or other suitable homogenizing device, de-aerated and packaged. Typical characteristics of the resulting product are dropping point above 500° F., when measured by ASTM D-2265 method, a density of about 7.4 pounds per gallon, and a penetration number of 288 when measured by ASTM D-217.

EXAMPLE III

While the above examples are based on the use of metallic soaps as grease thickeners, this is not necessary, as is exemplified by the compositions set forth in Table 3.

Table 3

| | Wt. percent |
|---|---|
| Silica gel | 8.5 |
| Coupling agent (polyalkylene glycol) | 1.2 |
| Naphthenic neutral oil, 650 SUS at 100° F. | 19.1 |
| Paraffinic neutral oil, 200 SUS at 100° F. | 21.7 |
| Brite stock, 150 SUS at 210° F. | 30.4 |
| 18% solution of polyisobutylene in 200 SUS neutral oil at 100° F. | 15.6 |
| 12% sulfurized sperm oil | 3.0 |
| Vanlube 601 [1] | 0.5 |

[1] Trademark of R. T. Vanderbilt Co., Inc., for a metal deactivator additive.

To form a silica gel grease, all the liquid components are pre-mixed, the silica gel thickener is added and stirred, and the entire contents are then passed through a colloid mill to obtain the desired penetration number, after which the resulting grease is de-aerated and packaged.

Typical characteristics of such a material are a penetration number of 317 as measured by ASTM D-217, a dropping point above 500° F. as measured by ASTM D-2265, and density of 7.5 pounds per gallon.

As illustrated above, the amount of polymer needed to obtain the desired characteristics is not only a function of the desired consistency, but of the type of thickener used, and the amount of additive agents in the finished grease. Therefore, variations in either grease thickener and polymer type or content may be made within wide limits to meet the needs of any particular antipollution control system. Thus, when using calcium complex or barium complex thickeners, the thickener should be present in amounts up to about 20%.

While the invention has been described in connection with specific embodiments thereof, it will be understood that it is capable of further modification. It will therefore be recognized that the invention is not to be considered as limited to the precise embodiments shown and described but is to be interpreted as broadly as permitted by the appended claims.

What is claimed is:

1. A lubricating grease which comprises from about 3% to 20% by weight of at least one grease thickener, selected from the group consisting of lithium soap, aluminum complex soap and silica gel, from about 70% to 96% by weight of a least one hydrocarbon lubricating oil having a viscosity of between about 40 to 165 SUS at 210° F. and from about 1% to 25% by weight of a linear polyisobutylene polymer having a molecular weight of from 5,000 to 20,000 (Staudinger method) which is soluble in said lubricating oil, said lubricating grease having a consistency of about 220 to 430 penetration number when measured by the method of ASTM D-217 and a density substantially less than water.

2. The lubricating grease defined in claim 1 in which said grease thickener consists essentially of a major amount of lithium hydroxystearate and a minor amount of lithium stearate and lithium naphthenate.

3. The lubricating grease defined in claim 1 in which the grease contains a mixture of lubricating fluids each of which has a viscosity of between about 40 to 150 SUS at 210° F., at least a portion of said mixture being naphthenic neutral oil.

4. The lubricating grease defined in claim 3 in which the lubricating fluid constitutes about 87% to 91% by weight of the grease composition and comprises a mixture of naphthenic neutral oil having a viscosity of about 650 SUS at 100° F., solvent-extracted paraffinic neutral oil having a viscosity of about 200 SUS at 100 F., and solvent extracted brite stock having a viscosity of about 150 SUS at 210° F.

5. The lubricating grease defined in claim 1 in which the grease consists essentially of about 6% to 8% by weight of lithium soap, said lithium soap comprising a mixture of aobut 75% to 85% by weight of lithium hydroxystearate, about 15% to 20% by weight of lithium stearate, and about 5% to 10% by weight of lithium naphthenate, about 70% to 96% by weight of a lubricating fluid mixture having a viscosity of between about 5.75 and 31.8 centistokes at 210° F. when measured by ASTM D-445, said lubricating fluid mixture comprising a mixture of about 20% to 30% of a naphthenic neutral oil having a viscosity of about 650 SUS at 100° F., about 30% to 45% of a solvent-extracted paraffinic neutral oil having a viscosity of about 200 SUS at 100° F., and about 35% to 45% of a solvent extracted brite stock having a viscosity of about 150 SUS at 210° F., and about 2% to 5% by weight of an isobutylene polymer having an average molecular weight of between about 5,000 and 20,000 (Staudinger method), said lubricating grease having a consistency of about 300 penetration number when measured by ASTM D–217 and a density of about 7.5 pounds per gallon.

6. The lubricating grease defined in claim 5 in which said grease contains about 3% to 6% by weight of additives selected from the group consisting of oxidation inhibitors, anti-rust agents and extreme pressure agents.

7. A method of controlling the consistency of a lubricating grease and the viscosity of its lubricating fraction independent of the density of the grease to provide a grease having a lubricating fraction of high viscosity and a density substantially less than water, comprising dissolving a predetermined amount of a linear, oil soluble polyisobutylene polymer having a molecular weight of from 5,000 to 20,000 in a hydrocarbon lubricating fluid having a viscosity of between about 40 to 165 SUS at 210° F. containing a grease thickener selected from the group consisting of lithium soap, aluminum complex soap and silica gel, and cooling the same to form a grease the amount of said polyisobutylene polymer dissolved in said lubricating oil being sufficient to provide a grease having a consistency of between about 220 and 430 penetration number when measured by ASTM D–217 and a lubricating fraction with a viscosity of at least about 12.92 to about 58.9 centistokes at 210° F. when measured by ASTM D–445.

8. The method defined in claim 7 in which an 18% to 20% solution of the polyisobutylene in a solvent extracted neutral oil is added to said lubricating fluid.

9. The method defined in claim 7 in which the amount of polyisobutylene polymer dissolved in the lubricating fluid is sufficient to provide a grease composition containing about 2% to 5% by weight of said polyisobutylene polymer.

10. A process of preparing a lubricating grease having a consistency of about 220 to 430 penetration number when measured by the method of ASTM D–217 and a density substantially less than water, the grease comprising about 6% to 8% by weight of a lithium soap, about 87% to 91% by weight of a lubricating fluid and about 2% to 5% by weight of a linear polyisobutylene polymer having an average molecular weight of at least about 1000 and higher up to the limit of its solubility in the lubricating fluid, said process comprising:

admixing an aqueous lithium hydroxide solution with naphthenic neutral oil and a long chain carboxylic acid having from 7 to 22 carbon atoms, heating said mixture to about 400° F. and maintaining this temperature for about 20 minutes, adding naphthenic neutral oil, to said mixture to cool the mixture to below about 360° F., adding to said mixture at least one lubricating oil having a viscosity of about 78 to 165 SUS at 210° F., said lubricating oil being added to said mixture in an amount sufficient to provide said mixture with a viscosity of between about 5.75 and 31.8 centistokes at 210° F. when measured by ASTM D–445, and adding to said mixture said polyisobutylene polymer.

References Cited
UNITED STATES PATENTS

| | | | |
|---|---|---|---|
| Re. 22,299 | 4/1943 | Earle | 252—42 |
| 2,275,123 | 3/1942 | Zimmer et al. | 252—42 |
| 2,363,013 | 11/1944 | Morway et al. | 252—42 |
| 2,470,965 | 5/1949 | Woods et al. | 252—41 |
| 2,746,924 | 5/1956 | Cottle et al. | 252—42 |
| 2,967,827 | 1/1961 | Bolt et al. | 252—56 |
| 3,158,574 | 11/1964 | Greenwood et al. | 252—42 |
| 3,252,949 | 5/1966 | Fields et al. | 252—56 |

DANIEL E. WYMAN, Primary Examiner

I. VAUGHN, Assistant Examiner

U.S. Cl. X.R.

252—35, 41, 59